United States Patent [19]

Knoll

[11] Patent Number: 5,058,266
[45] Date of Patent: Oct. 22, 1991

[54] METHOD OF MAKING INTERNALLY FINNED HOLLOW HEAT EXCHANGER

[75] Inventor: Richard Knoll, Cocoa Beach, Fla.

[73] Assignee: Norsk Hydro A.S., Oslo, Norway

[21] Appl. No.: 598,792

[22] Filed: Oct. 17, 1990

Related U.S. Application Data

[63] Continuation of Ser. No. 241,575, Sep. 8, 1988, abandoned.

[30] Foreign Application Priority Data

Sep. 8, 1987 [DE] Fed. Rep. of Germany ....... 3730117

[51] Int. Cl.[5] ...................... B21D 53/06; B23P 15/26
[52] U.S. Cl. ........................... 29/890.049; 29/890.053; 29/890.054; 72/256; 165/179; 228/183
[58] Field of Search ......... 29/527.4, 890.048, 890.049, 29/890.05, 890.054, 890.053; 72/256, 257, 368; 165/151, 152, 177, 179; 228/183, 208; 427/282, 287

[56] References Cited

U.S. PATENT DOCUMENTS

| | | | |
|---|---|---|---|
| 2,096,272 | 10/1937 | Young | 165/179 X |
| 2,151,540 | 3/1939 | Varga | 165/179 |
| 2,759,246 | 8/1956 | Campbell | 29/157.3 V X |
| 3,596,495 | 8/1971 | Huggins | 165/179 X |
| 3,603,384 | 9/1971 | Huggins et al. | 29/890.049 X |
| 3,625,257 | 12/1971 | Schroeder | 165/179 |
| 3,750,709 | 8/1973 | French | 165/179 X |
| 4,204,309 | 5/1980 | Lafranzois | 72/256 |
| 4,360,958 | 11/1982 | Kritzer | 29/157.3 B X |
| 4,512,069 | 4/1985 | Hagemeister | 72/256 X |
| 4,615,952 | 10/1986 | Knoll | 228/183 X |
| 4,645,119 | 2/1987 | Haramaki et al. | 228/183 |

OTHER PUBLICATIONS

Richard Knoll, Jr., "Drawn Light Wall Aluminum Tubing for Automotive Heat Exchangers Comes of Age in the USA", SAE Technical Paper No. 830024, 1983.

Primary Examiner—Joseph M. Gorski
Assistant Examiner—Peter Dungba Vo
Attorney, Agent, or Firm—Wenderoth, Lind & Ponack

[57] ABSTRACT

In a method of making a motor vehicle radiator, extruded hollow shapes of oval cross section provided inwardly with at least one longitudinally extending web lying transversely of the larger major axis of the oval cross section are reshaped, e.g. rolled, under pressure to a cross-sectional form of a flat profile tube having two parallel sides, soldered to cooling fins and fitted into a radiator housing. The extruded hollow shape is of light metal with a substantial oval cross section.

13 Claims, 3 Drawing Sheets

METHOD OF MAKING INTERNALLY FINNED HOLLOW HEAT EXCHANGER

This application is a continuation of now abandoned application Ser. No. 07/241,575 filed on Sept. 8, 1988 now abandoned.

BACKGROUND OF THE INVENTION

The present invention relates to a method of making a heat exchanger, in particular a motor vehicle radiator, and to a hollow shape for use in such a method.

Hitherto, radiators, in particular water radiators for internal-combustion engines of motor vehicles, have been made in Europe about 20% from conventional brass and copper tubes and about 80% from aluminum tubes.

Aluminum radiators, which due to their higher efficiency and their lower weight are preferred to the radiators of brass and copper tubes, are made in the form of plug-type radiators with plugged aluminum tubes or using welded aluminum tubes. The proportion of plug-type radiators of aluminum is about 50%, while the proportion of radiators of welded aluminum tubes is about 30%.

Radiators with welded aluminum tubes are in particular used in internal-combustion engines in which a high cooling power is required, as is the case in particular in engines for small trucks and high-performance engines for automobiles. The welded tubes for such radiators are made in an operation wherein metal sheets are rounded from strip metal and welded by pressure welding in the longitudinal direction at one side. These tubes have a flat profile, in contrast to the tubes for plug-type radiators which have a circular profile, and are coated on the outside with AlSi alloys. This silicon coating is applied during the rolling of the sheet metal itself prior to the rounding forming operation and serves to enable and welded tubes to be subsequently soldered to a water tank and cooling fins.

This soldering of the welded flat tubes, which consist of, e.g., an Al Mg Si 0.5 or an Al Mn alloy, to the water tank and the cooling fins of the same or similar material is made by brazing or hard soldering at a temperature above 450° C., in particular at 607 to 636° C., with the aid of flux or under vacuum without flux.

Both these possibilities of soldering the welded tubes to the fins and the water tank involve serious problems. When soldering with a flux the environmental problems are serious because detrimental substances are liberated by the flux and are very aggressive to aluminum and iron sheet and must therefore be washed off the soldered radiator to prevent the latter from corroding. Furthermore, resulting fumes must also be removed from the air to prevent sheet metal, possibly pressed in the vicinity for the vehicle bodyworks, from being attacked. For this purpose air cleaning, which involves high costs, is necessary. When soldering without flux these problems, due to detrimental substances, admittedly do not occur, but because this type of soldering must take place under vacuum and requires extremely accurate temperature control, high costs are also involved. Due to the high temperature of the soldering under vacuum, in addition only a short holding time in the soldering furnace is possible so that at the soldering joint a spot tends to be formed rather than an area contact, and this impairs the thermal conductivity at this point.

In radiators hitherto having such welded flat tubes, usually two tubes are arranged parallel to each other, each having a width of, for example, 22 mm, such width being the outer dimension of the tubes in the direction of the larger major axis of the flat profile. It has, however, been found that the cooling efficiency increases with increasing outer dimensions, so that preferably only one flat tube with a correspondingly larger width should be provided. In the manufacture of radiators, however, the flat tubes are laterally screwed and pressed to the fins before the soldering operation to obtain a continuous exactly defined area of contact between the two components, and thereafter are soldered in the furnace. Due to the pressure on the flat tube during pressing and the temperature existing in the furnace during soldering, however, a deformation (collapse) of the side faces of the flat profile occurs in the furnace because the aluminum becomes soft and sinks inwardly when the pressure is applied. This effect occurs in particular due to the fact that the aluminum tubes have a very small wall thickness of, for example, only 0.4 mm.

Furthermore, after the soldering of the tubes and the fins, the core of the radiator formed in this manner is fitted into the radiator housing or into a radiator bottom, and this operation must not cause any stress in the assembled radiator. However, due to the deformation of the components during soldering the necessary exact fit is difficult to achieve.

The problems regarding the collapse of the tubes and the lack of an exact fit become even more serious when, for increasing efficiency, wider flat profile tubes are used. Due to the aforementioned deformation of the tubes during soldering the waste in production then increases, and the silicon coating of the tubes leads to a further problem because these reject radiators cannot simply be scrapped.

SUMMARY OF THE INVENTION

It is therefore an object of the present invention to avoid the above problems and to provide a method of making heat exchangers, in particular a motor vehicle radiator, and a hollow shape for use in such method, by which high-performance radiators of aluminum can be formed at high efficiency.

This and other objects are achieved according to the invention by the provision that, in the method according to the invention welded tubes are not used, but rather extruded hollow shapes provided by a conventional extrusion press or forming machine are used. Such shape is provided with at least one web situated in an internal cavity thereof, such web having a triple function. Firstly, the web ensures during a subsequent rolling of the shape that flat profiled tubes are formed, with the wide sides of the flat profile being exactly parallel to one another. Secondly, the web imparts rigidity to the shape, thus providing better stability during the rolling or drawing operation and obtaining a higher dimensional stability with wide flat shapes. Thirdly, the web also represents a turbulator which, when the device is used for example as a water cooler, ensures a turbulent flow of the water circulating within the flat shape, thus resulting in a lower flow rate of water and a higher cooling efficiency.

Due to the webs provided in the hollow shapes, tubes of greater outer dimension of up to 40 mm can thus be used for making a heat exchanger, in particular a motor vehicle radiator, with high efficiency.

In a particular embodiment according to the invention, shapes made of aluminum or Al-alloy are provided with a zinc coating or a coating with an alloy on a zinc basis. The resulting tubes may then be soft-soldered to the cooling fins at a temperature below 450° C., and this contributes to the dimensional stability of the tubes, compared to hard-soldering of the welded tubes, because of these temperatures by nature a reduced deformation of the aluminum material is to be expected.

BRIEF DESCRIPTION OF THE DRAWINGS

Hereinafter the invention will be described in more detail and by examples of preferred embodiments with reference to the attached drawings, wherein.

DETAILED DESCRIPTION OF THE INVENTION

Figure 1A:
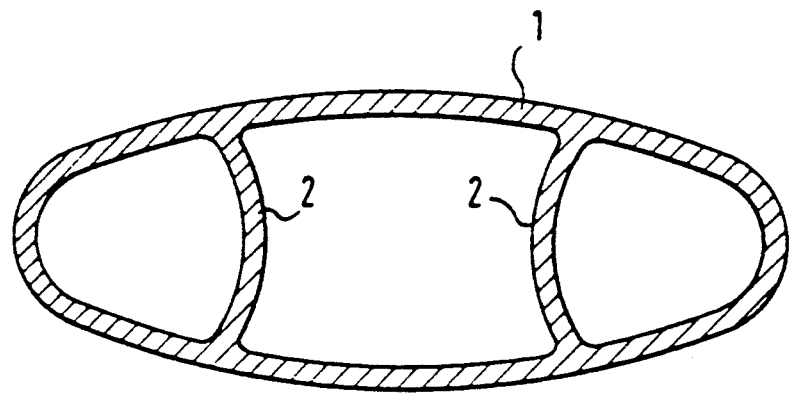
FIGS. 1A and 1B are sectional views illustrating a first embodiment of a hollow shape according to the invention, shown in the extruded state in FIG. 1A and in the rolled state as a finished tube in FIG. 1B.
Figure 1B:
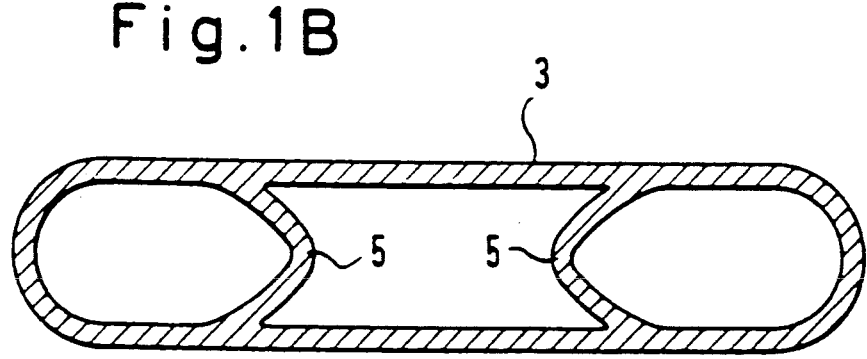

An example of a hollow shape according to the invention used for making a motor vehicle radiator by the method according to the invention is shown in FIGS. 1A and 1B of the attached drawings. The shape 1 shown in FIG. 1A is made of an aluminum alloy, e.g. of Al Mg Si 0.5 or Al Mn, and has an oval cross section with an outer dimension in the direction of the smaller major axis of, for example, 4 to 6 mm and an outer radius at the two outer sides of 1.2 mm. In the cavity of the shape two webs 2 are formed which extend continuously from one inner face to the other transversely of the direction of the large major axis of the oval cross section and in the longitudinal direction of the shape. These transverse webs 2 have a thickness substantially equal to the wall thickness of the shape 1. The transverse webs are provided with a preformed curvature in the transverse direction. As illustrated in FIG. 1B this curvature serves to cause the webs 2 to buckle inwardly upon rolling of the shape 1 illustrated in FIG. 1A so that the resulting half-circular webs 5 illustrated in FIG. 1B reinforce the flat tube 3 resulting from such rolling, as well as serving as a turbulator for water to be cooled that flows through the hollow shape. The flat tube illustrated in FIG. 1B may have an outer dimension in the direction of the shorter major axis of 2.0 mm, the outer radius at the two sides remaining unchanged, i.e. 1.2 mm. The embodiment of the hollow shape according to the invention shown in FIG. 1A may have a width, i.e. outer dimension in the direction of the larger major axis, such that the flat tube illustrated in FIG. 1B has corresponding outer dimensions of, for example, 32 mm to 40 mm without the dimensional accuracy and exact fit being impaired by the following soldering operation.

Figure 2A:
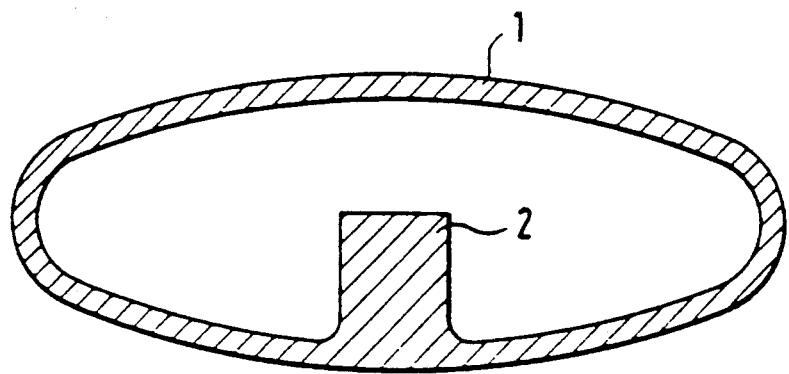
FIGS. 2A and 2B are sectional views illustrating a second embodiment of the hollow shape according to the invention, shown in the extruded state in FIG. 2A and in the rolled state in FIG. 2B.
Figure 2B:
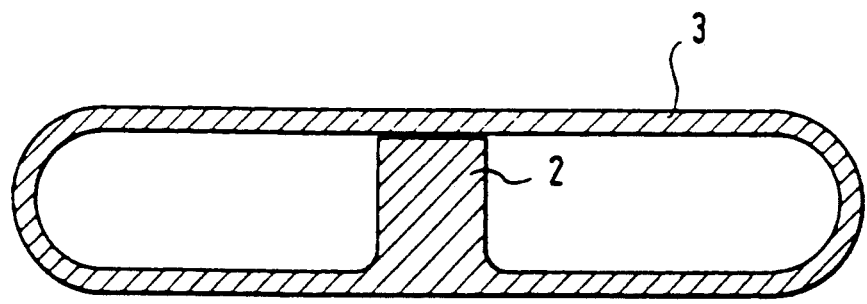

In FIG. 2A a further embodiment of the hollow shape 1 according to the invention is shown, and includes a single web protrusion 2 in the cavity which is integrally formed on an inner side of the shape. The web 2 has a height which corresponds to the height of the interior of the flat tube in FIG. 2B after rolling. It is ensured in this manner that the two outer sides of the flat tube in FIG. 2B extends exactly parallel due to the support by the web 2. The tube illustrated in FIG. 2A can, for example, have an outer dimension in the direction of the shorter major axis of 4 to 6 mm, a height of the web 2 of 1.6 mm and a wall thickness of 0.4 mm. This results in, after the rolling operation, a flat tube 3 which is illustrated in FIG. 2B and has an outer dimension in the direction of the shorter major axis of 2.4 mm, a height of the interior of 1.6 mm and a width, i.e. an outer dimension in the direction of the larger major axis, of 32 mm. The outer radius at the two sides is once again 1.2 mm.

Figure 3A:
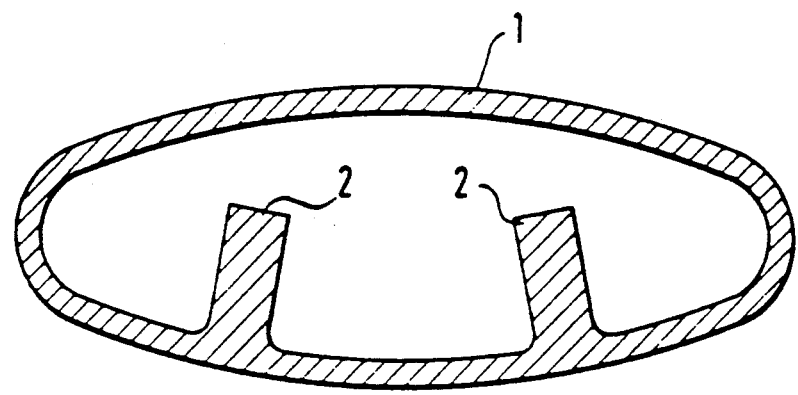
FIGS. 3A and 3B are sectional views illustrating a third embodiment of the hollow shape according to the invention, shown in the extruded state in FIG. 3A and in the rolled state in FIG. 3B.
Figure 3B:
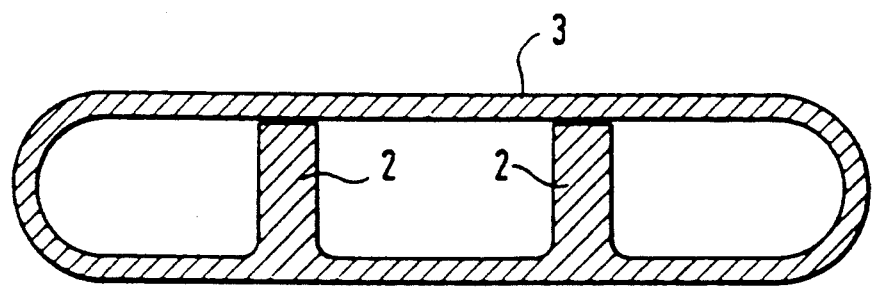

Finally, FIGS. 3A and 3B show a third embodiment of the hollow shape 1 according to the invention, and including two webs 2 which are integrally formed at an inner side of the shape 1 to extend at a predetermined angle and at locations the same distance from the sides of the hollow shape 1. This angle is chosen so that the webs 2 in the rolled flat tube 3, which is shown in FIG. 3B, are perpendicular to the inner faces. The webs 2 again have a height corresponding to the height of the interior of the flat tube 3 in FIG. 3B. The remaining dimensions correspond to the dimensions of the embodiment illustrated in FIGS. 2A and 2B. Since in the embodiment illustrated in FIGS. 3A and 3B two webs 2 are provided, a still greater stability of the tube results, along with a more pronounced swirl formation, i.e. turbulence, of the medium to be cooled that flows through the interior when the profile is used in a radiator. Thus, still wider tube profiles can be used in a radiator and thus motor vehicle radiators having extremely high efficiency can be made, as required for example for the engines of commercial vehicles.

Although several preferred embodiments of the invention have been described, it is apparent that modifications may be made thereto by people skilled in the art. Such modifications may be made without departing from the spirit or scope of the invention as set forth in the appended claims. E.g. the hollow shapes can be made of metals other than the disclosed Al-alloy and with other configurations of the cross section than the illustrated oval cross section.

I claim:

1. A method of forming heat exchanger structure, said method comprising:

extruding a plurality of longitudinally extending hollow sections of tubing each of which sections includes an outer peripheral portion having a substantially oval cross section in which first sides of the outer peripheral portion disposed opposite one another along the larger, major transverse axis defined by the oval cross section have predetermined radii of curvature and in which second sides of the outer peripheral portion disposed opposite one another along the smaller, minor axis defined by the oval cross section are outwardly convex as extending between said first sides, respectively, and at least one internal longitudinal web extending inwardly from said outer peripheral portion in a direction transverse to the larger, major transverse axis;

flattening the convex second sides of each of said sections of tubing in a radially inward direction until at least one internal partition is formed by said web that establishes a predetermined transverse width between said second sides and the second sides extend parallel to one another so that said sections are reshaped into flattened hollow tubes having accurate, predetermined dimensions; and assembling the flattened hollow tubes to external cooling fins thereby forming a heat exchanger core.

2. The method as claimed in claim 1, wherein said flattening is carried out while said predetermined radii of curvature are maintained, whereby the radii of curvature of the first sides of the flattened hollow tube remain the same as those formed in the step of extrusion.

3. The method as claimed in claim 1, wherein said extruding comprises extruding the hollow sections of aluminum or aluminum alloy.

4. The method as claimed in claim 1, wherein said flattening comprises subjecting said hollow sections of tubing to a rolling or drawing operation.

5. The method as claimed in claim 1, further comprising fitting the heat exchanger core into a radiator core.

6. The method as claimed in claim 1, wherein said extruding comprises extruding said web integrally with said outer peripheral portion at one transverse end only of said web and providing said web with a transverse dimension extending into the interior of said outer peripheral portion equal to said predetermined transverse width.

7. The method as claimed in claim 1 wherein said extruding comprises extruding each said outer peripheral portion such that a single web protrudes inwardly in said transverse direction midway along said larger, major transverse axis defined by the oval cross section.

8. The method as claimed in claim 1, wherein said extruding comprises extruding each of said hollow sections to include two said webs protruding inwardly in transverse directions from said outer peripheral portion with the spacing between said two webs being equal to the distance between each said web and a respective one of said first ends as taken along the larger, major transverse axis defined by the oval cross section.

9. The method as claimed in claim 1, wherein said extruding comprises extruding each of said hollow sections of tubing with a plurality of said webs, each of said webs being integral at opposite transverse ends thereof with said outer peripheral portion.

10. The method as claimed in claim 9, wherein said extruding comprises extruding each of said webs with a curvature extending inwardly of said hollow section as taken between said ends thereof, and said flattening results in inward buckling of said webs.

11. The method as claimed in claim 1, further comprising the step of coating said flattened hollow tubes with zinc or zinc alloy before said assembling.

12. The method as claimed in claim 11, wherein said assembling comprises soldering the flattened hollow tubes to said cooling fins.

13. The method as claimed in claim 12, wherein said soldering is conducted at a temperature below 450° C.

* * * * *